US008650455B2

(12) United States Patent
Kim

(10) Patent No.: US 8,650,455 B2
(45) Date of Patent: Feb. 11, 2014

(54) DIGITAL TRANSMITTING AND/OR RECEIVING APPARATUS AND METHOD THEREOF

(75) Inventor: Ki-bo Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 500 days.

(21) Appl. No.: 12/684,584

(22) Filed: Jan. 8, 2010

(65) Prior Publication Data

US 2010/0218067 A1     Aug. 26, 2010

(30) Foreign Application Priority Data

Feb. 23, 2009    (KR) .................. 10-2009-0014740

(51) Int. Cl.
*H03M 13/00* (2006.01)
(52) U.S. Cl.
USPC .......................................... 714/758; 714/800
(58) Field of Classification Search
None
See application file for complete search history.

(56) References Cited

U.S. PATENT DOCUMENTS

| | | | | | |
|---|---|---|---|---|---|
| 5,627,935 | A | * | 5/1997 | Kim | 386/263 |
| 5,778,139 | A | * | 7/1998 | Kim | 386/200 |
| 6,775,721 | B1 | * | 8/2004 | Tran | 710/52 |
| 6,987,717 | B2 | * | 1/2006 | Hagiwara et al. | 369/47.53 |
| 7,120,849 | B2 | * | 10/2006 | Hwang et al. | 714/752 |
| 7,209,455 | B2 | * | 4/2007 | Yee et al. | 370/310.1 |
| 7,369,633 | B2 | | 5/2008 | Jiang et al. | |
| 7,414,551 | B2 | * | 8/2008 | Lee et al. | 341/107 |
| 7,593,449 | B2 | * | 9/2009 | Shattil | 375/130 |
| 2004/0252229 | A1 | | 12/2004 | Jiang et al. | |
| 2004/0252725 | A1 | | 12/2004 | Sun et al. | |
| 2006/0107179 | A1 | * | 5/2006 | Shen et al. | 714/758 |
| 2006/0126492 | A1 | | 6/2006 | Hyun et al. | 370/208 |
| 2006/0133411 | A1 | * | 6/2006 | Denton et al. | 370/463 |
| 2008/0181344 | A1 | | 7/2008 | Jiang et al. | |
| 2008/0225818 | A1 | * | 9/2008 | Niu et al. | 370/342 |
| 2008/0225819 | A1 | * | 9/2008 | Niu et al. | 370/342 |
| 2009/0077447 | A1 | * | 3/2009 | Buckley et al. | 714/757 |

FOREIGN PATENT DOCUMENTS

| | | |
|---|---|---|
| KR | 100741629 B1 | 7/2007 |
| KR | 1020080089383 A | 10/2008 |
| WO | 2004105302 A1 | 12/2004 |
| WO | 2007120314 A2 | 10/2007 |
| WO | 2008054139 A1 | 5/2008 |

OTHER PUBLICATIONS

Qian Xu; Zixiang Xiong; , "Layered Wyner-Ziv Video Coding," Image Processing, IEEE Transactions on , vol. 15, No. 12, pp. 3791-3803, Dec. 2006.*
International Search Report, dated Sep. 17, 2010, issued in application No. PCT/KR2010/001055.

* cited by examiner

Primary Examiner — Daniel McMahon
(74) Attorney, Agent, or Firm — Sughrue Mion, PLLC

(57) ABSTRACT

A digital transmitting apparatus may include a first coder which codes a first layer data to add a first parity, a multiplexer which adds a second layer data to the first layer data to which the first parity is added, a second coder which codes the data outputted from the multiplexer to add a second parity, and a modulator which modulates the data to which the second parity is added and outputs the resultant data.

24 Claims, 6 Drawing Sheets

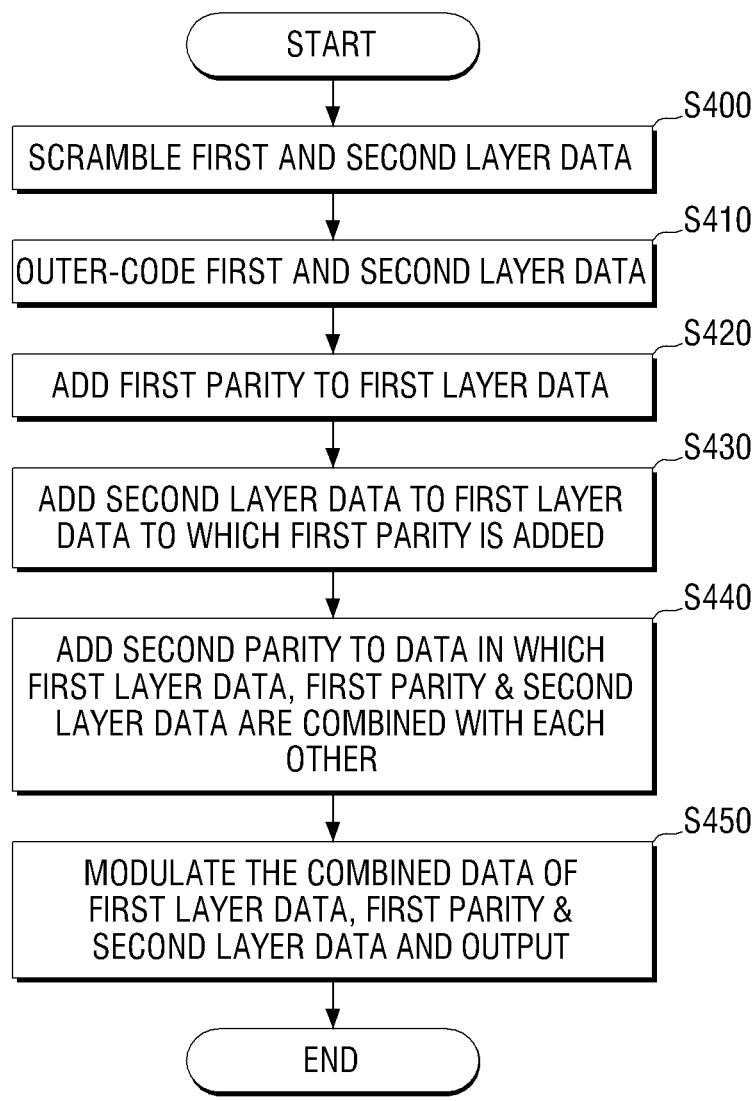

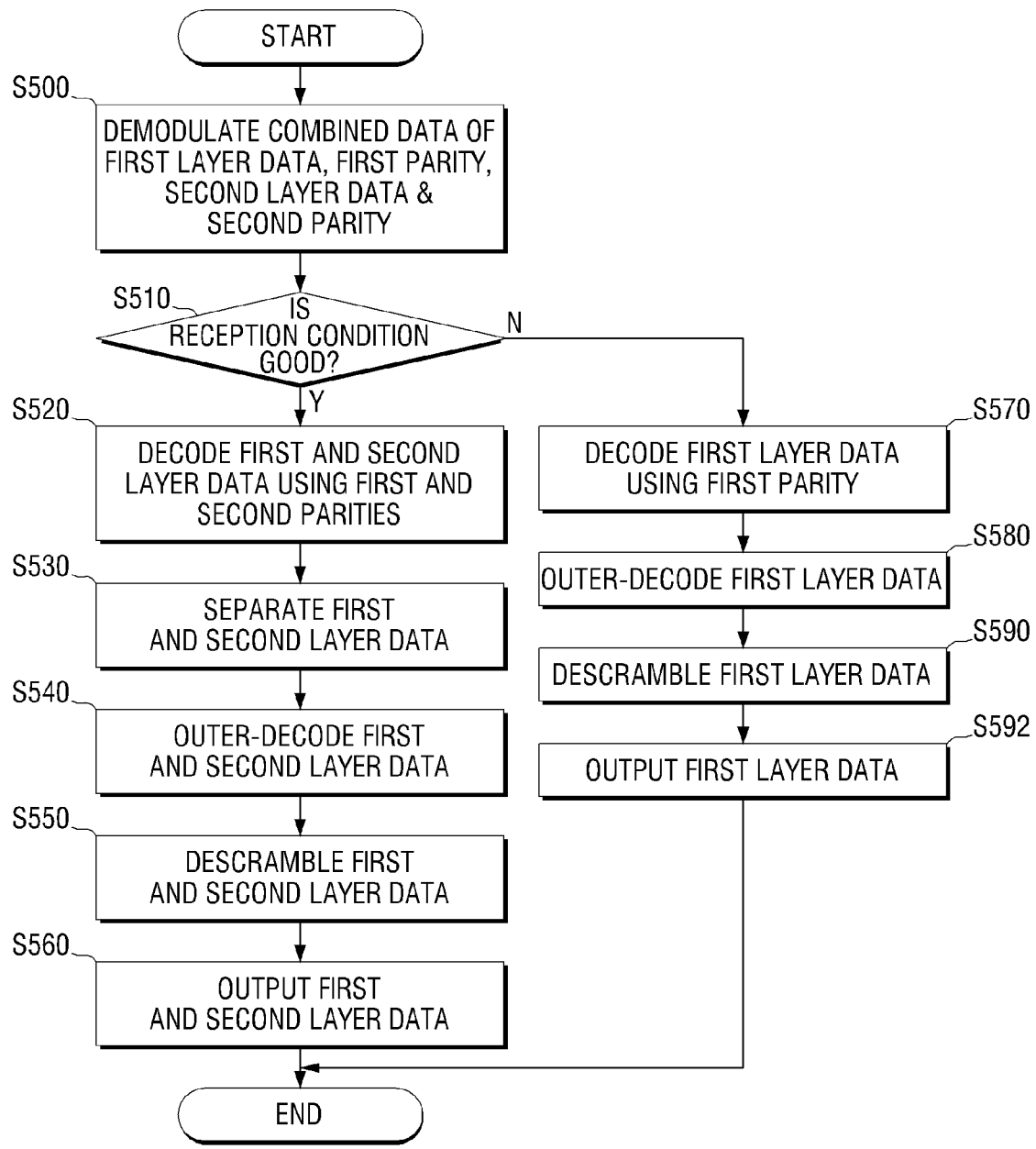

DIGITAL TRANSMITTING AND/OR RECEIVING APPARATUS AND METHOD THEREOF

CROSS-REFERENCE TO RELATED APPLICATION

This application claims priority from Korean Patent Application No. 10-2009-14740, filed on Feb. 23, 2009, in the Korean Intellectual Property Office, the disclosure of which is incorporated herein by reference in its entirety.

BACKGROUND OF THE INVENTION

1. Field of the Invention

Apparatuses and methods consistent with the present invention relate to a digital transmitting and/or receiving apparatus and a method thereof, and more particularly, to a digital transmitting and/or receiving apparatus for simplifying structure of a receiving apparatus in a hierarchical modulation and demodulation system, and a method thereof.

2. Description of the Related Art

There has been increasing demands for higher transmission upgradability such as SD video, 5.1 channel audio, or 3D video, but also increasing concerns about deteriorating reception quality which is experienced when the signal transmission rate is increased. Accordingly, effort has been made to find a way to increase the resolution of a mobile broadcast.

As high efficiency media coding technique is developed, and higher efficiency modulation technique and channel coding technique are demanded, an improved system is needed, which can provide enhanced transmission resolution and better reception quality.

The hierarchical modulation and demodulation is considered to be a scheme that can provide both enhanced transmission resolution and reception quality. Since the hierarchical modulation and demodulation technique enables transmission of both high and low resolution signals, a receiving end with better reception condition receives high resolution signal, while a receiving end with lower reception condition can receive low resolution signal.

Therefore, with the hierarchical modulation and demodulation technique, high resolution signal is received under a good reception condition, and low resolution signal instead of high resolution signal is received under a poor reception condition, thereby preventing interruption of broadcast.

However, the hierarchical modulation and demodulation system has shortcomings. That is, it is necessary to employ forward error correctors (FEC) for high and low resolution signals, respectively. This means complicated structure at a receiving end, and an increased amount of algorithms and subsequently increasing power consumption of a mobile device.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

Exemplary embodiments of the present invention provide a digital transmitting and/or receiving apparatus capable of simplifying a reception structure by receiving data selectively according to the reception condition of a sole decoder which is provided to a receiving end of a digital transmitting and/or receiving system, and a method thereof.

Consistent with an aspect of the present invention, a digital transmitting apparatus includes a first coder which codes a first layer data to add a first parity, a multiplexer which adds a second layer data to the first layer data to which the first parity is added, a second coder which codes a data outputted from the multiplexer to add a second parity, and a modulator which modulates the data to which the second parity is added and outputs the resultant data.

The first and second coders may adjoin each other with the multiplexer interposed therebetween.

The first and second coders may use a low-density parity-check (LDPC) code.

The digital transmitting apparatus may further include a first outer coder which outer-codes the first layer data and provides the resultant data to the first coder, and a second outer coder which outer-codes the second layer data and provides the resultant data to the multiplexer.

The digital transmitting apparatus may further include at least one of a first interleaver which interleaves the first layer data which is outer-coded, and provides the resultant data to the first coder, a second interleaver which interleaves the second layer data which is outer-coded, and provides the resultant data to the multiplexer, and a third interleaver which interleaves the data to which the second parity is added.

Consistent with an aspect of the present invention, a digital receiving apparatus includes a demodulator which demodulates a data in which a first layer data, a first parity, a second layer data and a second parity are combined with each other, and a decoder which decodes at least one of the first and second layer data using at least one of the first and second parities according to a reception condition.

The first parity may result from coding the first layer data, and the second parity may result from coding the first layer data, the first parity and the second layer data.

The decoder may use a low-density parity-check (LDPC) code.

The digital receiving apparatus may further include a demultiplexer which outputs the decoded data as it is if the decoded data is decoded with the first parity, or separates the first and second layer data from the decoded data and outputs the first and second layer data if the decoded data is decoded with the second parity.

The digital receiving apparatus may further include a first outer decoder which outer-decodes the first layer data outputted from the demultiplexer, and a second outer decoder which outer-decodes the second layer data outputted from the demultiplexer.

Consistent with another aspect of the present invention, a digital transmitting method includes coding a first layer data to add a first parity, multiplexing to add a second layer data to the first layer data to which the first parity is added, coding the data outputted from the multiplexing to add a second parity, and modulating the data to which the second parity is added and outputting the resultant data.

The adding of the first parity and the adding of the second parity may use a low-density parity-check (LDPC) code.

The digital transmitting method may further include outer-coding the first layer data, and outer-coding the second layer data.

The digital transmitting method may further include at least one of interleaving the first layer data which is outer-coded, interleaving the second layer data which is outer-coded, and interleaving the data to which the second parity is added.

Consistent with still another aspect of the present invention, a digital receiving method includes demodulating a data in which a first layer data, a first parity, a second layer data, and a second parity are combined with each other, and decoding at least one of the first layer data and the second layer data using at least one of the first parity and the second parity, in accordance with a reception condition.

The first parity may result from coding the first layer data, and the second parity may result from coding the first layer data, the first parity and the second layer data.

The decoding may use a low-density parity-check (LDPC) code.

The digital receiving method may further include demultiplexing which comprises outputting the decoded data as it is if the decoded data is decoded by the first parity, or separating the first and second layer data from the decoded data and outputs the first and second layer data if the decoded data is decoded by the second parity.

The digital receiving method may further include outer-decoding the first layer data outputted from the demultiplexing, and outer-decoding the second layer data outputted from the demultiplexing.

In another aspect of the invention, there is a digital receiving method including: demodulating a data comprising a first layer data, a first parity, a second layer data, and a second parity; and decoding the first layer data using the first parity if a reception condition is of a first level, and decoding the first layer data and the second layer data using the first parity and the second parity if the reception condition of a second level, wherein the second level is higher than the first level.

Additional and/or other aspects and advantages of the invention will be set forth in part in the description which follows and, in part, will be obvious from the description, or may be learned by practice of the invention.

BRIEF DESCRIPTION OF THE DRAWINGS

The above and/or other aspects of the present invention will be more apparent by describing certain exemplary embodiments of the present invention with reference to the accompanying drawings, in which:

FIG. 5 is a flowchart provided to explain a transmitting method of a hierarchical transmission according to an exemplary embodiment of the present invention; and FIG. 6 is a flowchart provided to explain a reception method of a hierarchically-transmitted data according to an exemplary embodiment of the present invention.

DETAILED DESCRIPTION OF THE EMBODIMENTS

Figure 1:
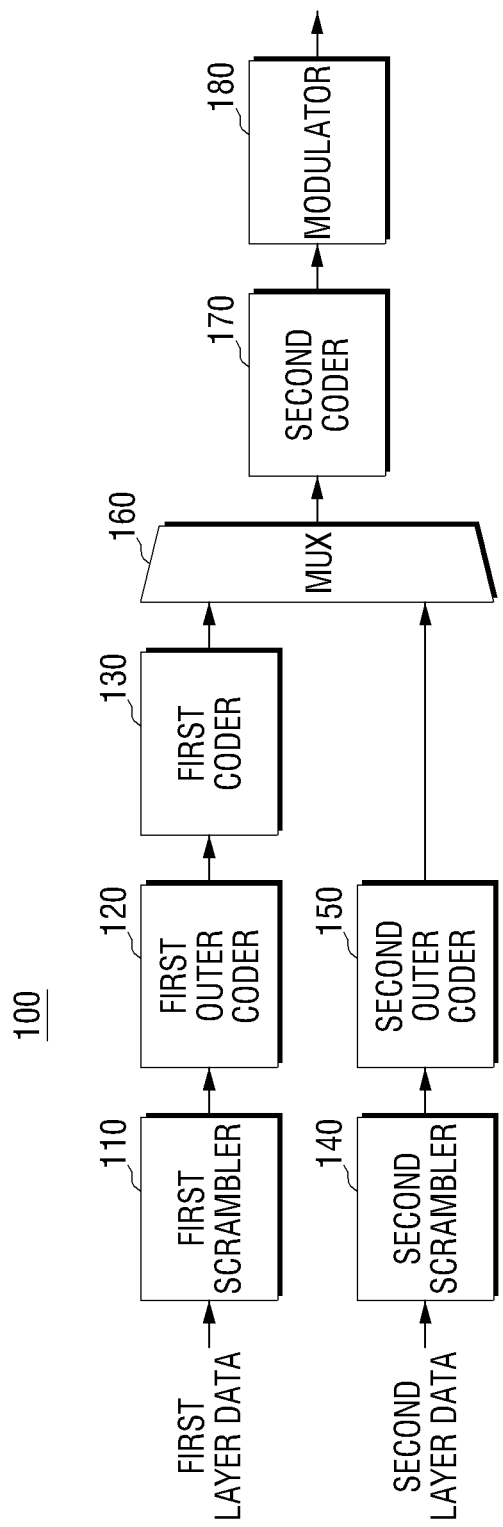
FIG. 1 is a block diagram of a digital transmitting apparatus according to an exemplary embodiment of the present invention.

Certain exemplary embodiments of the present invention will now be described in greater detail with reference to the accompanying drawings.

In the following description, same drawing reference numerals are used for the same elements even in different drawings. The matters defined in the description, such as detailed construction and elements, are provided to assist in a comprehensive understanding of the invention. Thus, it is apparent that the exemplary embodiments of the present invention can be carried out without those specifically defined matters. Also, well-known functions or constructions are not described in detail since they would obscure the invention with unnecessary detail.

FIG. 1 is a block diagram of a digital transmitting apparatus according to an exemplary embodiment of the present invention.

Referring to FIG. 1, a transmitting apparatus 100 according to an exemplary embodiment of the present invention may include a first scrambler 110, a first outer coder 120, a first coder 130, a second scrambler 140, a second outer coder 150, a multiplexer (MUX) 160, a second coder 170, and a modulator 180.

A first layer data and a second layer data are inputted to the transmitting apparatus 100, respectively. The first layer data provides a low resolution broadcast if it is impossible to provide high resolution broadcast due to a poor reception condition at a receiving end, and the second layer data provides a higher resolution broadcast if the receiving end has a good reception condition. In other words, the first layer data is data for a low resolution broadcast, and the second layer data is data for a high resolution broadcast.

The first scrambler 110 scrambles the first layer data. The term 'scramble(s)' herein refers to removing correlativity of data by mixing input data with pseudo random binary sequence (PRBS).

The first outer coder 120 outer-codes the first layer data which is scrambled at the first scrambler 110. The first outer coder 120 may use Reed-Solomon (RS) code, or Bose-Chadhuri-Hocquenghem (BCH) code to perform outer coding.

The first coder 130 codes the first layer data, which is outer-coded at the first outer coder 120, to add a first parity. Therefore, the first parity is the parity of the first layer data.

The first coder 130 may use a low-density parity-check (LDPC) code to perform coding. By using LDPC code, the original data remains intact due to the characteristics of a systematic code.

The second scrambler 140 scrambles the second layer data. Both the first and second scramblers 110, 140 perform the same operation, except that the two scramble different targets.

The second outer coder 150 outer-codes the second layer data, which is scrambled at the second scrambler 140. The second outer coder 150 may use RS code, or BCH code to perform outer coding.

The MUX 160 receives from the first coder 130 the first layer data to which the first parity is added, and receives the second layer data from the second outer coder 150. The MUX 160 multiplexes the first layer data to which the first parity is added, and the second layer data, to output a combined data form of the first layer data, the first parity, and the second layer data.

The second coder 170 codes the combined data form of the first layer data, the first parity, and the second layer data from the MUX 160, and adds a second parity. Accordingly, the second parity is the parity of the first layer data, the first parity, and the second layer data.

Like the first coder 150, the second coder 170 may use the LDPC code to perform coding. The second coder 170 outputs a combined data form of the first layer data, the first parity, the second layer data and the second parity. One should understand that the above order of data is only one of examples, and therefore, each data can be output in a different order depending on a system adapted.

The modulator 180 modulates the combined data form of the first layer data, the first parity, the second layer data and the second parity, which is received from the second coder 170, and outputs the resultant data. The modulated data from the modulator 180 is transmitted over an antenna.

Although single first layer data is exemplified as being input to the transmitting apparatus 100 according to an exemplary embodiment of the present invention, this should not be construed as limiting and other examples are possible. By way of example, a plurality of first layer data can be input to the transmitting apparatus 100, and in this case, the transmitting apparatus 100 may include a plurality of first scramblers 110, and a plurality of first outer coders 120.

Figure 2:
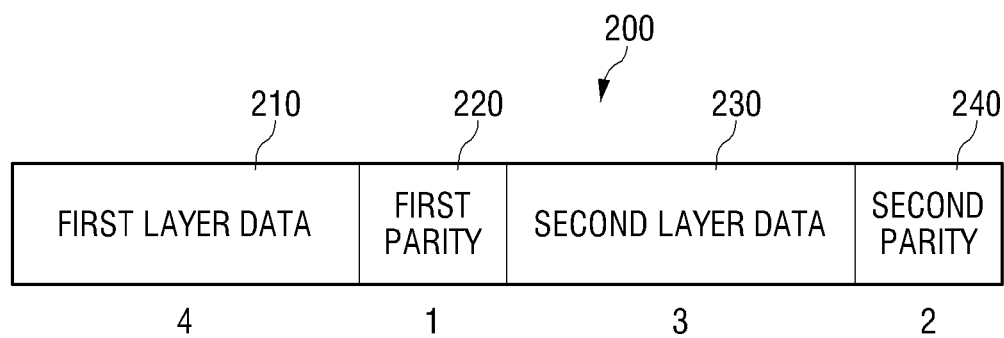
FIG. 2 illustrates a data frame structure according to an exemplary embodiment of the present invention.

FIG. 2 illustrates the data frame structure according to an exemplary embodiment of the present invention.

Referring to FIG. 2, the data frame structure output from the transmitting apparatus 100 of FIG. 1 will be explained below. The data frame 200 outputted from the transmitting apparatus 100 includes a combined data form of the first layer data 210, the first parity 220, the second layer data 230, and the second parity 240. The rate of the first layer data 210, the first parity 220, the second layer data 230, and the second parity 240 may be 4:1:3:2.

After the first layer data 210 passes the first scrambler 110, the first outer coder 120, and the first coder 130, the data frame 200 of FIG. 2 has a combined data form of only the first layer data 210 and the first parity 220.

After that, the second layer data 230 is added to the combined data form of the first layer data 210 and the first parity 220 at the MUX 160. After the data passes the second coder 170, the data exemplified in FIG. 2 is outputted, which includes therein the first layer data 210, the first parity 220, the second layer data 230 and the second parity 240 in sequence.

The first parity 220 is the parity of the first layer data 210, and the second parity 240 is the parity of the first layer data 210, the first parity 220 and the second layer data 230. In other words, it is possible to correct the error of the first layer data 210 using the first parity, and correct the error of the first layer data 210 and the second layer data 230 using the second parity 240.

Figure 3:
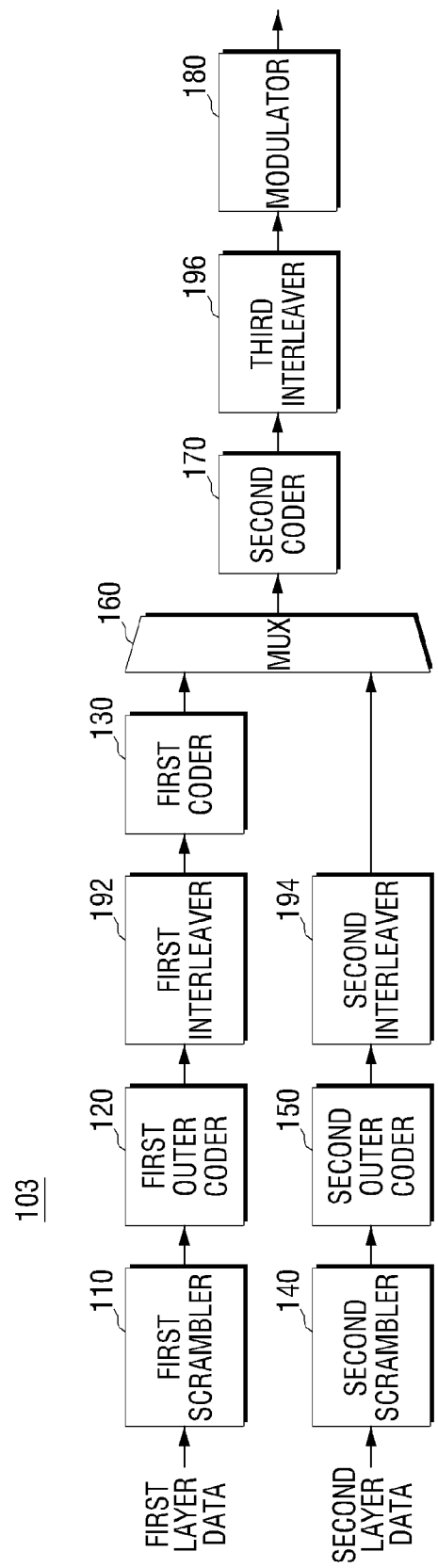
FIG. 3 is a block diagram of a digital transmitting apparatus according to an exemplary embodiment of the present invention.

FIG. 3 is a block diagram of a digital transmitting apparatus according to an exemplary embodiment of the present invention.

Some constituents of the transmitting apparatus 103 of FIG. 3 are similar to those of the transmitting apparatus 100 of FIG. 1, and therefore, the like elements of FIG. 3 will be denoted by the same reference numerals of FIG. 1.

Referring to FIG. 3, the transmitting apparatus 103 includes a first scrambler 110, a first outer coder 120, a first interleaver 192, a first coder 130, a second scrambler 140, a second outer coder 150, a second interleaver 194, a MUX 160, a second coder 170, a third interleaver 196, and a modulator 180.

The first scrambler 110, the first outer coder 120, the first coder 130, the second scrambler 140, the second outer coder 150, the MUX 160, the second coder 170, and the modulator 180 are same as those illustrated in FIG. 1, and thus will not be explained in detail below.

The first interleaver 192 interleaves the data (i.e., first layer data) 210 outputted from the first outer coder 120.

The second interleaver 194 interleaves the data (i.e., second layer data) 230 outputted from the second outer coder 150.

The third interleaver 196 interleaves the data outputted from the second coder 170, in which the outputted data has the combined data form of the first layer data 210, the first parity 220, the second layer data 230, and the second parity 240.

The transmitting apparatus 103 illustrated in FIG. 3 additionally has the first to third interleavers 192, 194, 196, when compared to the structure of the transmitting apparatus 100 illustrated in FIG. 1. In other words, the transmitting apparatus 100 may have varied structure as occasion needs. For example, the first and second outer coders 120, 150 may be omitted from the transmitting apparatuses 100 and 103 illustrated in FIGS. 1 and 3.

Figure 4:
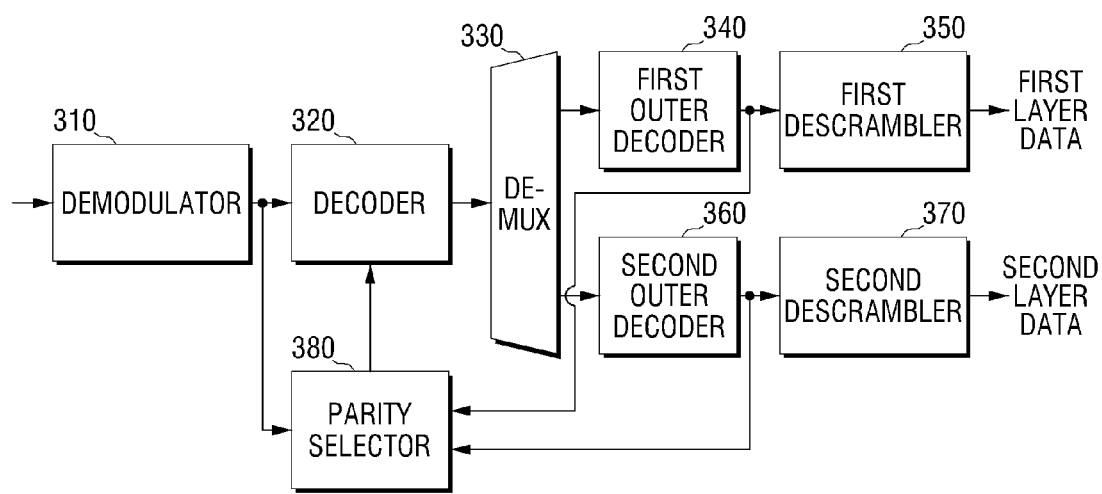
FIG. 4 is a block diagram of a digital receiving apparatus according to an exemplary embodiment of the present invention.

FIG. 4 is a block diagram of a digital receiving apparatus according to an exemplary embodiment of the present invention.

Referring to FIG. 4, the receiving apparatus 300 according to an exemplary embodiment of the present invention includes a demodulator 310, a decoder 320, a demultiplexer (DEMUX) 330, a first outer decoder 340, a first descrambler 350, a second outer decoder 360, a second descrambler 370, and a parity selector 380.

The receiving apparatus 300 receives data from the transmitting apparatus 100 of FIG. 1 or FIG. 3. The received data has the data frame 200 as illustrated in FIG. 2, and thus includes a combined form of the first layer data 210, the first parity 220, the second layer data 230 and the second parity 240.

The demodulator 310 demodulates the data inputted to the receiving apparatus 300, in which the inputted data has the combined form of the first layer data 210, the first parity 220, the second layer data 230, and the second parity 240. The demodulator 310 performs the operation of the transmitting apparatus 100 in a reverse manner.

The decoder 320 decodes at least one of the first layer data 210 and the second layer data 230 using at least one of the first parity 220 and the second parity 240 in accordance with the reception condition. The decoding operation of the decoder 320 is reverse to the operation of the first and second coders 130, 170 of the transmitting apparatus 100. The decoder 320 may use LDPC code.

The decoder 320 receives the result of parity selection from the parity selector 380 which will be explained in detail below. According to the inputted result of parity selection, the decoder 320 performs decoding using the first parity 220 or the second parity 240.

That is, if the receiving apparatus 300 is with a good reception condition and thus it is possible to provide a high resolution broadcast, the decoder 320 decodes both the first and second layer data 210, 230 using the second parity 240. At this time, the decoder 320 may perform additional decoding using the first parity 220 to deal with any remaining error.

Therefore, when the reception condition is good, the decoder 320 may first decode the first and second layer data 210, 230 using the second parity 240, and then secondly decode the first layer data 210 using the first parity 220 to deal with a remaining error. If the decoder 320 performs decoding twice as explained above, a remaining error can be corrected.

On the other hand, if the receiving apparatus 300 is with a poor reception condition and thus it is possible to provide only a low resolution broadcast, the decoder 320 decodes the first layer data 210 only, using the first parity 220.

Note that it is possible to broadcast the first layer data 210 alone, while it is possible to broadcast the second layer data 230 always in combination with the first layer data 210.

Therefore, if the receiving apparatus 300 is with a good reception condition, the decoder 320 decodes both the first and second layer data 210, 230.

The DEMUX 330 outputs decoded data from the decoder 320 as it is, if the data is decoded by the first parity 220. However, if the data from the decoder 320 is decoded by the first and second parities 220, 240, the DEMUX separates the decoded data into the first and second layer data 210, 230 and outputs the separated data, respectively. The DEMUX 330 provides the first layer data 210 to the first outer decoder 340, and provides the second layer data 230 to the second outer decoder 360.

The first outer decoder 340 outer-decodes the first layer data 210 outputted from the DEMUX 330. The first outer decoder 340 performs the operation in a reverse manner to that of the first outer coder 120 of the transmitting apparatus 100.

The first descrambler 350 descrambles the first layer data 210 outputted from the first outer decoder 340. The first descrambler 350 performs the operation in a reverse manner to that of the first scrambler 110 of the transmitting apparatus 100.

The second outer decoder 360 outer-decodes the second layer data 230 outputted from the DEMUX 330. The operation of the second outer decoder 360 is in reverse relation to that of the second outer coder 150 of the transmitting apparatus 100.

The second descrambler 370 descrambles the second layer data 230 outputted from the second outer decoder 360. The operation of the second descrambler 370 is in reverse relation to that of the second scrambler 140 of the transmitting apparatus 100.

The parity selector 380 may check a signal-to-noise ratio (SNR) of a signal outputted from the demodulator 310, and check a bit error ratio (BER) of a signal outputted from the first and second outer decoders 340, 360. After that, the parity selector 380 may determine reception condition using SNR and BER, and according to the determined reception condition, determine whether to use the first parity 220 or the second parity 240 at the decoder 320. The parity selector 380 selects one from among the first and second parities 220, 240 and provides the decoder 320 with the result.

The receiving apparatus 300 with a good reception condition outputs both the first and second layer data 210, 230, but with a poor reception condition, the receiving apparatus 300 outputs only the first layer data 210.

FIG. 5 is a flowchart provided to explain a method of a hierarchical transmission according to an exemplary embodiment of the present invention.

The hierarchical transmitting method according to an exemplary embodiment of the present invention will be explained below with reference to FIGS. 1 to 5.

At S400, the first and second layer data 210, 230 are inputted to the transmitting apparatus 100, in which the first layer data 210 is scrambled by the first scrambler 110 and the second layer data 230 is scrambled by the second scrambler 140.

At S410, the first layer data 210 scrambled is outer-coded at the first outer coder 120, and the second layer data 230 scrambled is outer-coded at the second outer coder 150.

At S420, the first layer data 210, which has passed the first scrambler 110 and the first outer coder 120, is coded at the first coder 130 and so is appended with the first parity 220.

The MUX 160 receives from the first coder 130 an input of the first layer data 210 to which the first parity 220 is appended, and receives from the second outer coder 150 the second layer data 230. Accordingly, at S430, the MUX 160 multiplexes the first layer data 210 to which the first parity 220 is appended, and the second layer data 230, and outputs the resultant data. By the operation of the MUX 160, data is formed, in which the first layer data 210, the first parity 220 and the second layer data 230 are combined with each other in sequence. However, the order of data described above is only one of examples. Therefore, one will understand that each data can be placed in various orders depending on a system adapted.

At S440, the combined data form of the first layer data 210, the first parity 220 and the second layer data 230, outputted from the MUX 160, is coded by the second coder 170 and so is appended with the second parity 240. By the operation of the second coder 170, data is formed, in which the first layer data 210, the first parity 220, the second layer data 230 and the second parity 240 are combined with each other in sequence. However, the order of data described above is only one of examples. Therefore, one will understand that each data can be placed in various orders depending on a system adapted.

At S450, the data outputted from the second coder 170 is modulated at the modulator 180 and outputted. The modulated data from the modulator 180 is transmitted to the receiving apparatus 300.

FIG. 6 is a flowchart provided to explain a method of receiving hierarchically-transmitted data according to an exemplary embodiment of the present invention.

The receiving method of the hierarchically-transmitted data according to an exemplary embodiment of the present invention will be explained below with reference to FIGS. 1 to 4 and FIG. 6.

The receiving apparatus 300 receives a data frame 200 from the transmitting apparatus 100. Accordingly, at S500, the demodulator 310 demodulates the data in which the first layer data 210, the first parity 220, the second layer data 230, and the second parity 240 are combined with each other. Herein, the first parity 220 is the parity of the first layer data 210, and the second parity 240 is the parity of the first layer data 210, the first parity 220 and the second layer data 230.

If reception condition is good at S510-Y, the decoder 320 decodes the first layer data 210 and the second layer data 230 using the second parity 240, at S520. More specifically, the decoder 320 decodes the first layer data 210, the first parity 220 and the second layer data 230 using the second parity 240. As occasion demands, the decoder 320 may decode the first and second layer data 210, 230 using the second parity 240, and then additionally decode the first layer data 210 using the first parity 220 to deal with any remaining data error.

At S530, if the decoder 320 decodes the first and second layer data 210, 230, the DEMUX 330 separates the first and second layer data 210, 230 from each other, and provides the first layer data 210 to the first outer decoder 340 and provides the second layer data 230 to the second outer decoder 360.

At S540, the first outer decoder 340 outer-decodes the first layer data 210, and the second outer decoder 360 outer-decodes the second layer data 230.

At S550, the first descrambler 350 descrambles the first layer data 210 and the second descrambler 370 descrambles the second layer data 230. Accordingly, at S560, the first and second layer data 210, 230 are outputted.

If the reception condition is poor at S510-N, the decoder 320 decodes the first layer data 210 using the first parity 220.

At S580, the DEMUX 330 outputs the first layer data 210, which is decoded at the decoder 320, to the first outer decoder 340, and the first outer decoder 320 outer-decodes the first layer data.

At S590, the first descrambler 350 descrambles the first layer data 210 which is outer-decoded. Accordingly, at S592, the first layer data 210 is outputted. In this case, the second outer decoder 360 and the second descrambler 370 are not operated.

As explained above, the receiving apparatus 300 according to an exemplary embodiment of the present invention employs a hierarchical transmission structure, but requires only one decoder 320 to decode the first and second layer data 210, 230. Accordingly, the receiving apparatus 300 has a simpler structure, and is able to selectively receive the first and second layer data 210, 230 according to the reception condition, without requiring separate FEC blocks for each of the first layer data 210 and the second layer data 230.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A digital transmitting apparatus, comprising:
    a first coder which codes a first layer data to add a first parity and outputs a first combined data comprising the first layer data and the first parity;
    a multiplexer which adds a second layer data to the first combined data, to output multiplexed data comprising the first combined data and the second layer data, in this order;
    a second coder which codes the multiplexed data outputted from the multiplexer to add a second parity; and
    a modulator which modulates the coded data to which the second parity is added and outputs modulated data,
    wherein the first layer data comprises low-resolution data, and
    the second layer data comprises high-resolution data.

2. The digital transmitting apparatus of claim 1, wherein the first coder and the second coder adjoin each other with the multiplexer interposed therebetween.

3. The digital transmitting apparatus of claim 1, wherein the first coder and the second coder use low-density parity-check (LDPC) codes.

4. The digital transmitting apparatus of claim 1, further comprising:
    a first outer coder which outer-codes the first layer data and provides the outer-coded first layer data to the first coder; and
    a second outer coder which outer-codes the second layer data and provides the outer-coded second layer data to the multiplexer.

5. The digital transmitting apparatus of claim 4, further comprising at least one of:
    a first interleaver which interleaves the outer-coded first layer data, and provides the interleaved first layer data to the first coder;
    a second interleaver which interleaves the outer-coded second layer data, and provides the interleaved second layer data to the multiplexer; and
    a third interleaver which interleaves the multiplexed data to which the second parity is added.

6. A digital receiving apparatus, comprising:
    a demodulator which demodulates an input data in which a first layer data, a first parity, a second layer data and a second parity are combined;
    a selector which determines a degree of quality of a reception condition which indicates the quality of the reception condition existing in the digital receiving apparatus when the input data is demodulated; and
    a decoder which decodes at least one of the first layer data and the second layer data using at least one of the first parity and the second parity according to the degree of quality of the reception condition as determined by the selector, to output decoded data,
    wherein the first layer data comprises low-resolution data, and
    the second layer data comprises high-resolution data.

7. The digital receiving apparatus of claim 6, wherein the first parity results from coding the first layer data, and the second parity results from coding the first layer data, the first parity and the second layer data.

8. The digital receiving apparatus of claim 6, wherein the decoder uses a low-density parity-check (LDPC) code.

9. The digital receiving apparatus of claim 6, further comprising a demultiplexer which outputs the decoded data if the decoded data is decoded with the first parity, or separates the first layer data and the second layer data from the decoded data and outputs the first layer data and the second layer data if the decoded data is decoded with the second parity.

10. The digital receiving apparatus of claim 9, further comprising:
    a first outer decoder which outer-decodes the first layer data outputted from the demultiplexer; and
    a second outer decoder which outer-decodes the second layer data outputted from the demultiplexer.

11. A digital transmitting method, comprising:
    coding a first layer data to add a first parity;
    outputting a first combined data comprising the first layer data and the first parity;
    adding a second layer data to the first combined data,
    multiplexing the first combined data and the second layer data, and outputting the first combined data and the second layer data, in this order;
    coding output multiplexed data to add a second parity; and
    modulating the coded data to which the second parity is added and outputting modulated data,
    wherein the first layer data comprises low-resolution data, and
    the second layer data comprises high-resolution data.

12. The digital transmitting method of claim 11, wherein the coding the first layer data and the coding the multiplexed data comprises using low-density parity-check (LDPC) codes.

13. The digital transmitting method of claim 11, further comprising:
    outer-coding the first layer data; and
    outer-coding the second layer data.

14. The digital transmitting method of claim 13, further comprising:
    interleaving the outer-coded first layer data;
    interleaving the outer-coded second layer data; or
    interleaving the data to which the second parity is added.

15. A digital receiving method, comprising:
    demodulating an input data in which a first layer data, a first parity, a second layer data, and a second parity are combined;
    determining a degree of quality of a reception condition which indicates the quality of the reception condition existing when the input data is demodulated; and
    decoding at least one of the first layer data and the second layer data using at least one of the first parity and the second parity, in accordance with the degree of quality of the reception condition, to output decoded data, wherein the first layer data comprises low-resolution data, and the second layer data comprises high-resolution data.

16. The digital receiving method of claim 15, wherein the first parity results from coding the first layer data, and the second parity results from coding the first layer data, the first parity and the second layer data.

17. The digital receiving method of claim 15, wherein the decoding uses a low-density parity-check (LDPC) code.

18. The digital receiving method of claim 15, further comprising demultiplexing which comprises outputting the decoded data if the decoded data is decoded by the first parity, or separating the first layer data and the second layer data from the decoded data and outputting the first layer data and the second layer data if the decoded data is decoded by the second parity.

19. The digital receiving method of claim 18, further comprising:

outer-decoding the first layer data outputted from the demultiplexing; and outer-decoding the second layer data outputted from the demultiplexing.

20. A digital receiving method comprising:

demodulating an input data comprising a first layer data, a first parity, a second layer data, and a second parity;

determining a degree of quality of a reception condition which indicates the quality of the reception condition existing when the input data is demodulated; and decoding the first layer data using the first parity if the degree of quality of the reception condition is of a first level, and decoding the first layer data and the second layer data using the first parity and the second parity if the degree of quality of the reception condition is of a second level higher than the first level, wherein the first layer data comprises low-resolution data, and the second layer data comprises high-resolution data.

21. The digital receiving method of claim 20, wherein the determining the degree of quality of the reception condition comprises checking a signal-to-noise ratio of the demodulated data.

22. The digital receiving method of claim 21, further comprising checking a bit error ratio.

23. The digital transmitting apparatus of claim 1, wherein:

the multiplexer outputs the multiplexed data comprising the first layer data, the first parity, and the second layer data, in this order; and the second coder outputs a second combined data comprising the first layer data, the first parity, the second layer data, and the second parity, in this order.

24. The digital transmitting apparatus of claim 1, wherein the high-resolution data of the second layer data provides a higher resolution broadcast than that provided by the low-resolution data of the first layer data.

* * * * *